Figure 1:
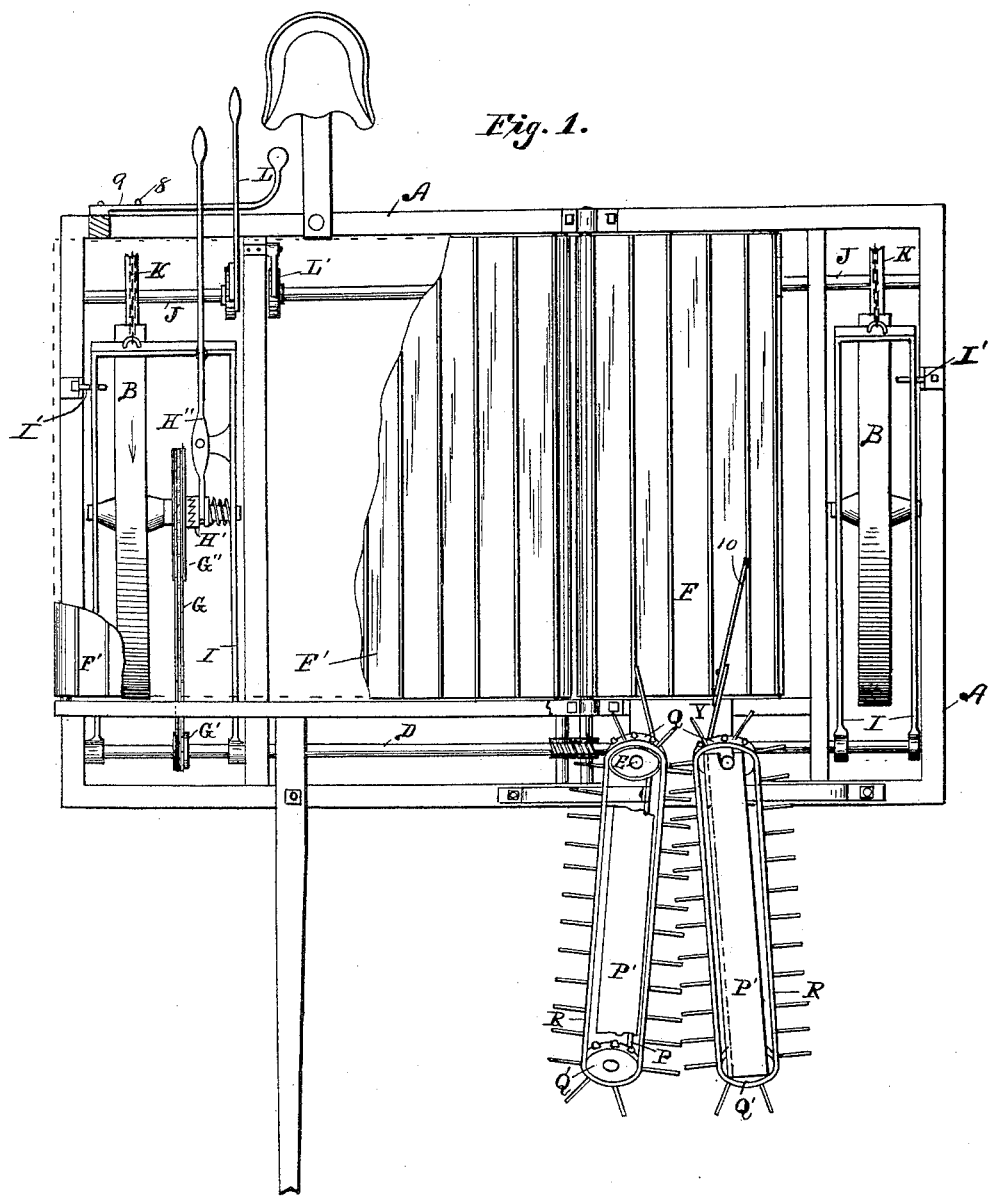
Figure 6:
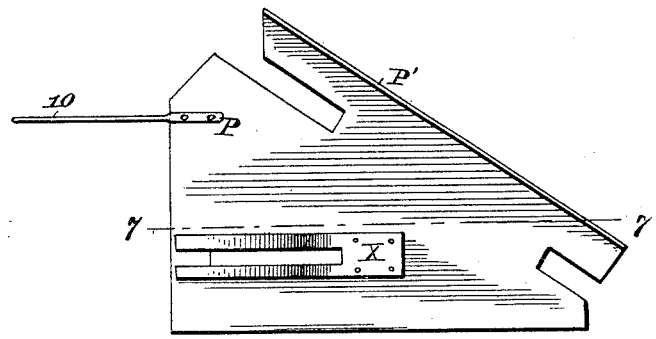
Figure 7:
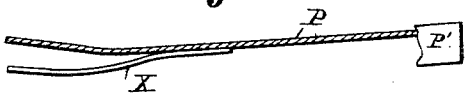

(No Model.) 4 Sheets—Sheet 1.
L. V. LEWIS & S. S. ALLEN.
CORN HARVESTER.

No. 477,132. Patented June 14, 1892.

WITNESSES:
Harry S. Rohrer
Harrison P. Wirre

INVENTORS:
L. V. Lewis
S. S. Allen
BY
Miles & Greene,
ATTORNEYS.

(No Model.) 4 Sheets—Sheet 2.
L. V. LEWIS & S. S. ALLEN.
CORN HARVESTER.
No. 477,132. Patented June 14, 1892.
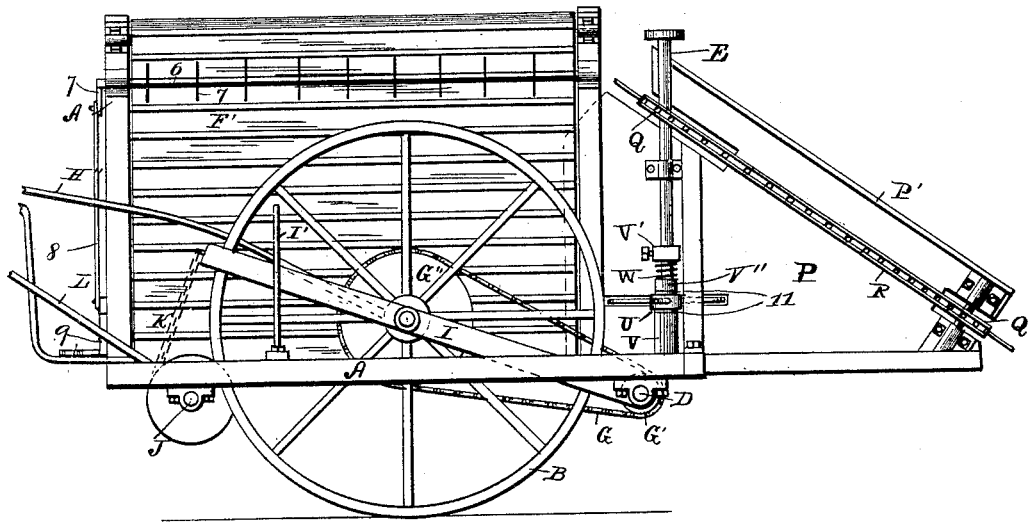
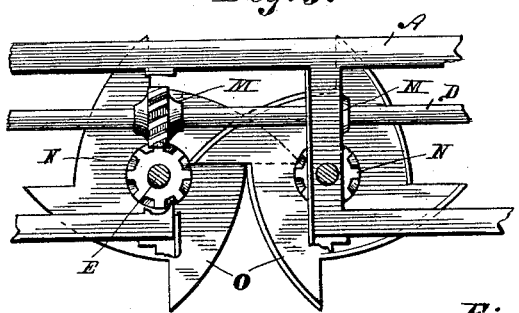
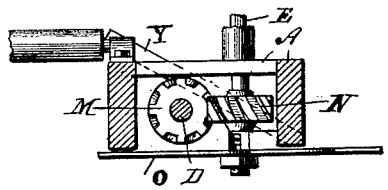
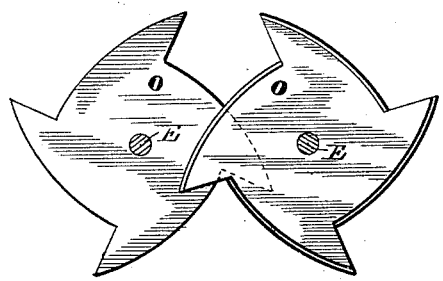
WITNESSES:
Harry S. Rohrer
Harrison P. Wirre
INVENTORS:
L. V. Lewis,
S. S. Allen.
BY
Wiles & Greene
ATTORNEYS.

(No Model.) 4 Sheets—Sheet 3.

L. V. LEWIS & S. S. ALLEN.
CORN HARVESTER.

No. 477,132. Patented June 14, 1892.

Witnesses:
Harry S. Rohrer
Harrison P. Ware

Inventors:
L. V. Lewis
S. S. Allen
By Wiles & Greene,
Attorneys.

(No Model.) 4 Sheets—Sheet 4.

L. V. LEWIS & S. S. ALLEN.
CORN HARVESTER.

No. 477,132. Patented June 14, 1892.

Witnesses:
Walter F. Rench.
Clement F. Wood

Inventors:
L. V. Lewis
S. S. Allen
By Wiles & Seem, Attys

UNITED STATES PATENT OFFICE.

LEDYARD V. LEWIS AND STEPHEN S. ALLEN, OF SUN PRAIRIE, WISCONSIN.

CORN-HARVESTER.

SPECIFICATION forming part of Letters Patent No. 477,132, dated June 14, 1892.

Application filed January 22, 1891. Serial No. 378,674. (No model.)

*To all whom it may concern:*

Be it known that we, LEDYARD V. LEWIS and STEPHEN S. ALLEN, of Sun Prairie, in the county of Dane and State of Wisconsin, have invented certain new and useful Improvements in Corn-Harvesters; and we do hereby declare the following to be a full, clear, and exact description of the invention, such as will enable others skilled in the art to which it pertains to make and use the same.

This invention involves such novel features as are hereinafter set forth, and particularly pointed out in the claims.

The devices are fully illustrated in the drawings.

Figure 1 is a plan of the machine with parts broken away; Fig. 2, an elevation looking to the left in Fig. 1; and Figs. 3, 4, 5, 6, 7, 8, 9, 10, 11, 12, 13, and 14, detail views.

In the figures, A is a frame supported by wheels B and provided with a suitable tongue and seat arranged in the ordinary way. A power-shaft D crosses the machine near the front and transmits motion to two vertical knife-shafts E, to a nearly horizontal transverse endless apron F, and to a second inclined apron F', adapted to receive the material carried by the first and deposit it at one side of the machine. No binding devices are shown, though suitable devices may be added when desired.

Upon the end portions of the shaft D are pivotally mounted the front ends of yokes I, U-shaped in outline, which extend rearward and have near the middle bearings, respectively, for the wheels B. The rear ends of these yokes are connected to a transverse drum-shaft J, by chains K, winding upon the latter when it is rotated. Such rotation is caused by a lever L alongside the seat, and common pawl-and-ratchet mechanism at L' prevents accidental reverse rotation. Now when these chains are shortened by winding the whole frame is raised, the yokes acting as inclined levers fulcrumed upon the axles and swinging toward a horizontal position by elevating the frame with reference to said axles. Forked or slotted guide-posts I', rigidly fixed to the frame A and embracing, respectively, the outer sides of the yokes, confine them to a plane perpendicular to the frame in case uneven ground or other cause tend to produce swaying from side to side.

The shaft D is actuated by a chain G, passing over suitable sprocket-wheels G' G" upon it and upon the axle. The latter of these sprocket-wheels is thrown into engagement with the axle by means of an ordinary clutch H', operated by a lever H", pivoted upon the yoke and extending rearward toward the seat. Power is transmitted to the knife-shafts E through the gears M upon the shaft D, which engage, respectively, the gears N upon the lower ends of the knife-shafts. The engaging-gears are in perpendicular planes, and the teeth upon the two sets are inclined oppositely, so that the knife-shafts are rotated in opposite directions. The gear-teeth are spiral and inclined in general direction at an angle of forty-five degrees with reference to the elements of the gear-cylinder. By this gearing the two shafts passing each other are connected without the loss of speed arising from the use of worm-gearing. It is essential that the shafts should so pass—that is, that the vertical shafts should extend below the plane of the power-shaft, for the knives must be below all other parts in order that the stubble may not be struck continually in the next round. Below the gears are approximately star-shaped knives O, which overlap in the space between the shafts. The coacting cutting-edges of each pair of sections or blades are convex curves whose cords are tangent to a circle of much greater diameter than the shaft. It follows that the cutting-edges make a very small angle with each other when in cutting relation, (see Fig. 3,) and that they pass each other very quickly. After any two points pass no cutting is done during the first part of the mutual approach of the succeeding pair of coacting edges; but at the same time it is impossible for any stalk to pass beyond the point where it will be cut when at length the edges meet. Owing to this construction the knives, though rotating with a constant speed, cut with a succession of quick clips and with the rounded edges of a pair of pruning-shears.

Fig. 3 shows the knives at the beginning of the cut, and Fig. 4 the same after a rotation more than double that required to complete the cut. Though both edges are convex, there is no slipping of the stalks, because they are held above and below, as will appear, and because the knives are moving forward with the machine. Just within the shafts are vertical partition-like walls P, which extend forward beyond the main frame and rearward to the edge of the apron F and form a way for the stalks both before and after severing. The upper edges of the walls slope forward and downward, and upon them are secured plates P'. Beneath the plates P' run arm-bearing chains R, which pass about sprocket-wheels Q Q' and collect the stalks and force them rearward between the walls past the knives. These arms 4 are fixed to plates 3, Figs. 11 and 12, in such manner as to swing upward, but not downward. Undue upward movement is prevented by the plates P'. Each link 2 is so made that it may freely engage and disengage the adjacent link by means of an open hook 5; but as the back of the link is turned toward the sprocket-wheel there is no liability to accidental disengagement. When the arms 4 strikes the stalks, they tend to swing rearward by rotation upon the pivotal connection with the adjacent link and thus to permit the stalks to escape. Each link is therefore provided with bars 6, extending for some distance along the outer face of the next link to prevent the undesirable rotation.

Figure 8:
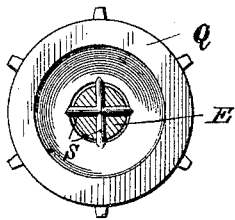
Figure 9:
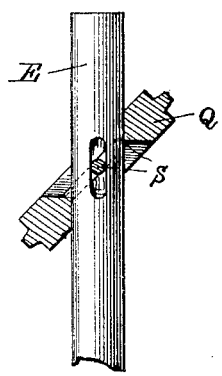
Figure 10:
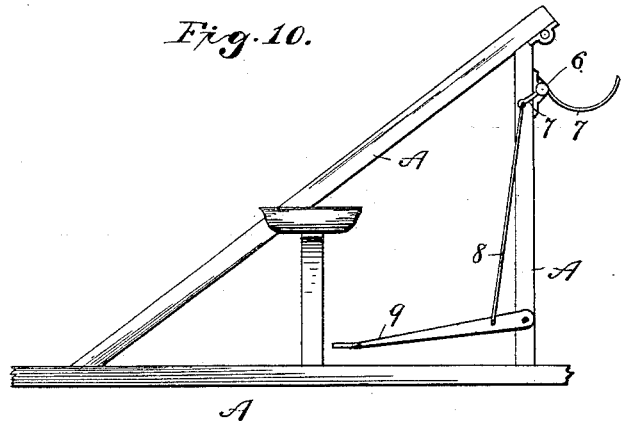
Figure 11:
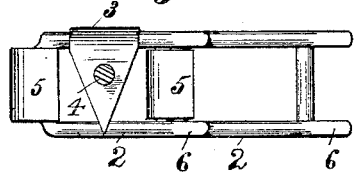
Figure 12:
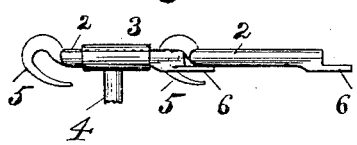
Figure 13:
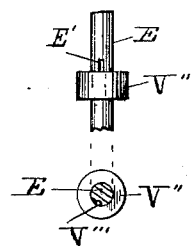
Figure 14:
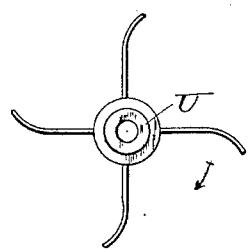

The sprocket Q' is of usual construction and turns upon an oblique axis; but the other is mounted obliquely upon the shaft by which it is driven. That it may act constantly in this oblique plane while rotating with the shaft it is centrally cut away to form a cone-like recess upon each face, sloping inward to the driving-shaft. Midway between the two faces are radial arms S, making an angle with each other and lying in corresponding V-shaped slots in the shaft. The cone walls of the two faces rest normally against opposite sides of the shaft, and as the latter rotates the wheel remains in the same plane, while its arms rise and fall in the slots. Fig. 8 is a plan of the sprocket-wheel when rocked into a plane perpendicular to the shaft, which is shown in section. Fig. 9 is a vertical section of the wheel when in working position upon the shaft. Lower down upon the same shafts are reels U, having forwardly-curved arms, which work through slots in the walls P and extend, respectively, nearly across the space between said walls. Each reel is loose upon its shaft and is held between collars V V'', from which it is separated by washers 11, of leather or the like, which increase friction and may be renewed when worn. The collar V is fixed to the shaft and the other slides thereon, but is prevented from rotating by a spline or feather V''', working in a groove E' in the shaft E. Above each reel is a spring W, coiled about the shaft and resting against the collar V'' and pressing thereon with any desired yielding force, depending upon the adjustment of a collar V' above the spring. It follows that the reel rotates with the shaft under ordinary conditions, but slips upon it when the resistance is such as might cause breakage.

To facilitate disengagement of the arms from the stalks at the proper time and to prevent the stalks or leaves thereon from clogging in the slots in the walls, springs X are fixed at their front ends to the walls in position to stand out therefrom alongside the paths of the reels and they are preferably forked or slotted, so as to act both above and below the arms. Between the walls an inclined floor Y extends from a point just in rear of the cutting portions of the knives to the edge of the apron F, and along this the severed ends of the stalks pass as they are forced rearward by the reels and chains. At the instant of cutting the stalks are held above the knives by the reels and chain-arms and below the knives by their attachment to the ground, and hence they do not slip from the advancing knives, though the cutting-edges are convex and require little power. A rod 10 is bolted to the wall P next the grain side of the machine and extends rearward and toward the corresponding wheel to prevent stalks from being thrown too far back upon the first traveling apron. As the stalks fall from the upper end of the second apron they are caught in a trough formed by arms 7, secured to a rock-shaft 6, mounted upon the frame A. A rock-shaft is held against rotation by means of an arm connected by a rod 8 to a pivoted lever 9, upon which the foot of the driver rests. When the trough contains enough stalks for a bundle, the driver allows the lever 9 to swing upward, when the weight of the stalks instantly causes the trough to fall and discharge its contents. Depressing the lever restores the parts to their original position.

We have shown the knives as each made from a single piece of metal; but evidently the sections may be distinct, and, indeed, such construction has certain advantages.

What we claim is—

1. The combination, with a frame, of a horizontal power-shaft, the vertical shafts arranged forward of the power-shaft, the lower ends of said shafts extending below the power-shaft, the star-like cutter-knives secured upon the lower end of the vertical shafts, the spiral gear-wheels mounted upon the power-shaft, and the spiral gears mounted upon the vertical shafts in the same horizontal plane as the power-shaft and adapted to mesh with the spiral gears on said power-shaft, substantially as shown and described.

2. The combination, with the stalk-passage walls slotted horizontally at their rear sides, of the vertical shafts arranged adjacent to said rear sides, the stalk-reels mounted upon said shafts and adapted to pass through the slots in the walls, and the bifurcated spring-plates secured to the inner faces of the walls coincident with the slots, whereby the reels will work between the members of the bifurcated plates, substantially as shown and described.

3. In a corn-harvester, the combination, with a shaft having longitudinal slots at right angles to each other, of a wheel arranged upon said shaft, said wheel having diametrically-crossing arms within the bore of the same, which arms rest within the longitudinal slots and are operated substantially as shown and described.

4. The combination, with the frame, of the horizontal power-shaft, the spiral gears carried thereon, the vertical shafts arranged forward of the power-shafts and extending above and below the same, the spiral gears mounted upon the vertical shafts in the same horizontal plane as the power-shaft, the knives secured upon the lower ends of the vertical shafts, and the stalk-reels arranged upon the vertical shafts above the power-shaft, a collar resting upon the hub of said reel, and a vertically-yielding fastening device bearing upon said collar to hold the reel normally rigid with the vertical shaft and permit it to revolve when a predetermined resistance limit is exceeded.

5. The combination, with the frame and the knife-shafts mounted thereon, of the sprocket-wheels mounted obliquely upon said shafts and having radial arms in different diametrical planes and lying in slots in the shafts, secondary sprocket-wheels mounted below the first and in front of the knife-shafts, and chains passing around each pair of sprocket-wheels and provided with stalk-gathering arms, substantially as set forth.

In testimony whereof we have signed this specification in the presence of two subscribing witnesses.

LEDYARD V. LEWIS.
STEPHEN S. ALLEN.

Witnesses:
A. S. BOYLES,
W. D. BURRINGTON.